Feb. 28, 1961  B. SASSEN  2,972,868
MACHINE TOOL SLIDE CONTROL
Original Filed Oct. 22, 1953  4 Sheets-Sheet 1

INVENTOR
*Bernard Sassen*

BY *Cushman, Darby & Cushman*
ATTORNEYS

Feb. 28, 1961  B. SASSEN  2,972,868
MACHINE TOOL SLIDE CONTROL
Original Filed Oct. 22, 1953  4 Sheets-Sheet 2
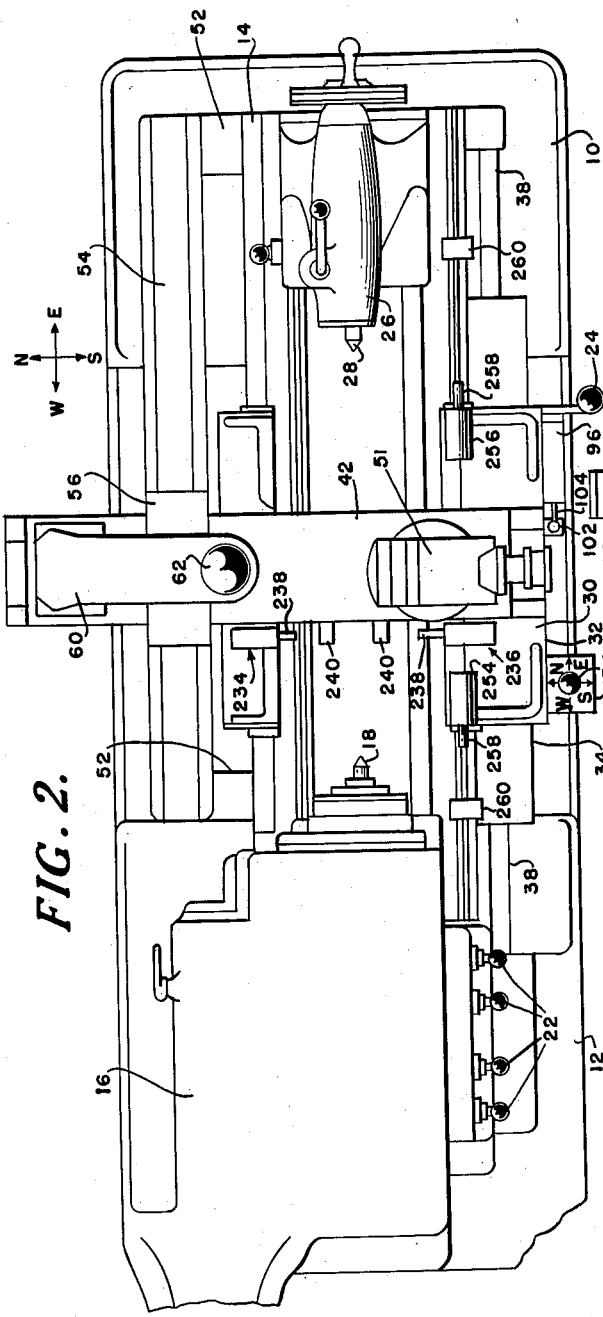
INVENTOR
*Bernard Sassen*
BY *Cushman, Darby & Cushman*
ATTORNEYS

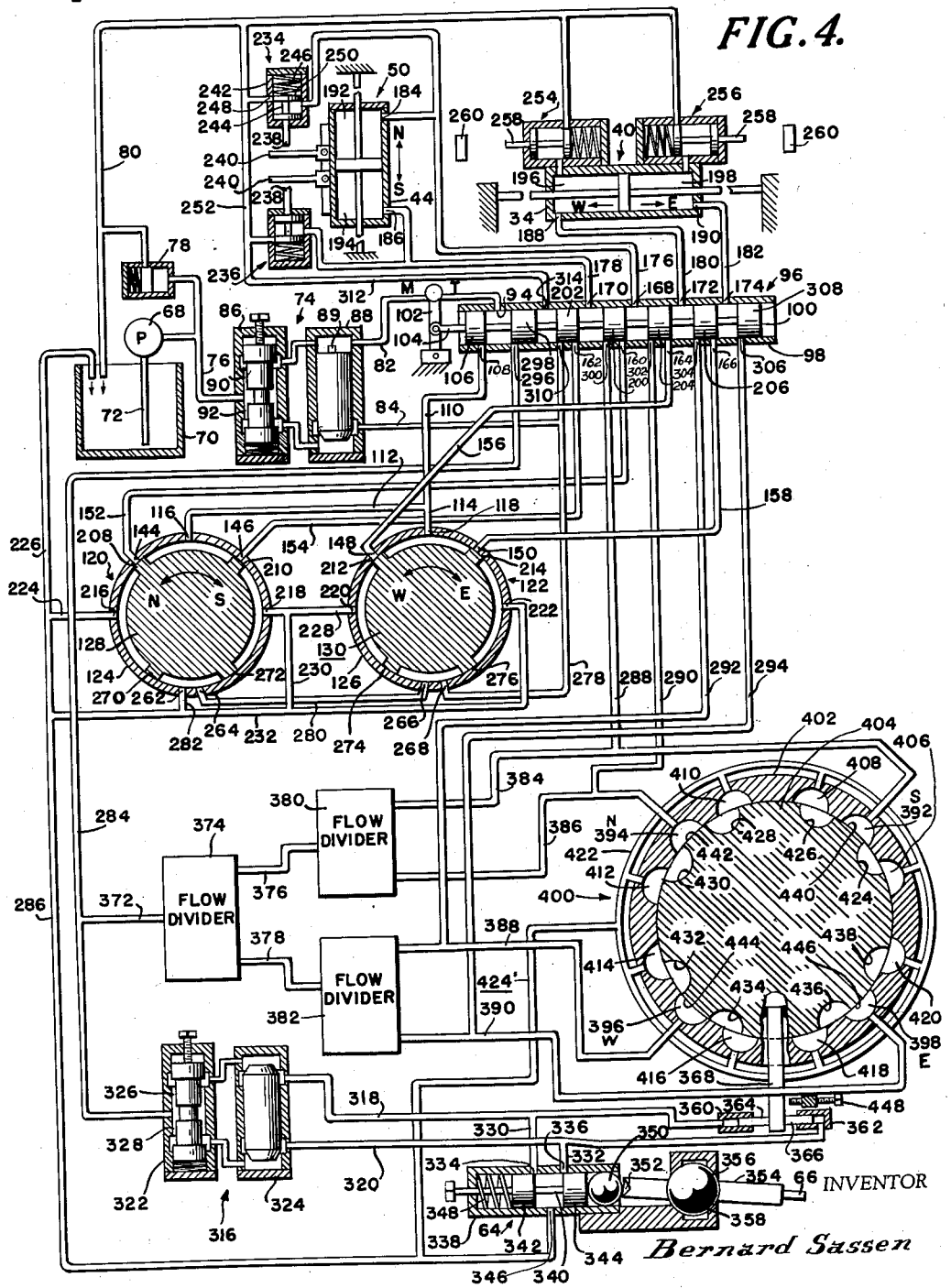

Feb. 28, 1961  B. SASSEN  2,972,868
MACHINE TOOL SLIDE CONTROL
Original Filed Oct. 22, 1953  4 Sheets-Sheet 4
FIG.5.
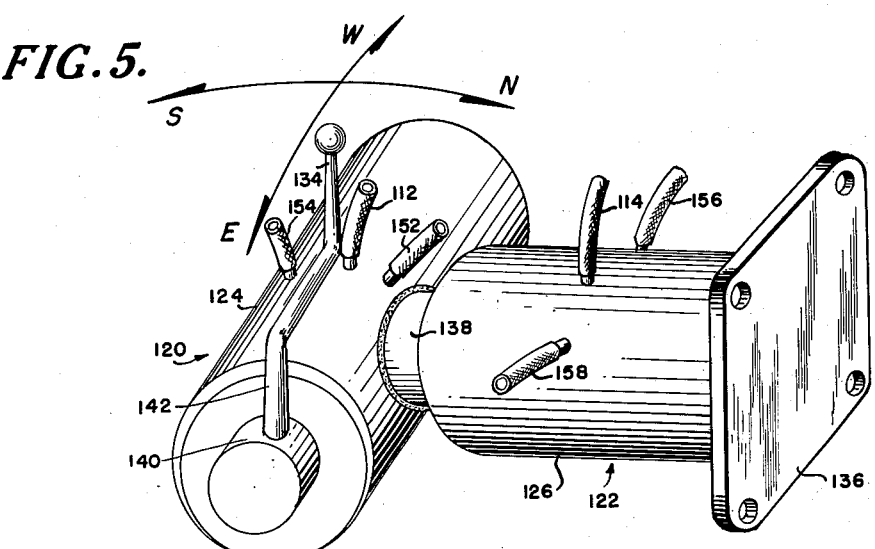
FIG.6. TRACER UNIT VALVE POSITION
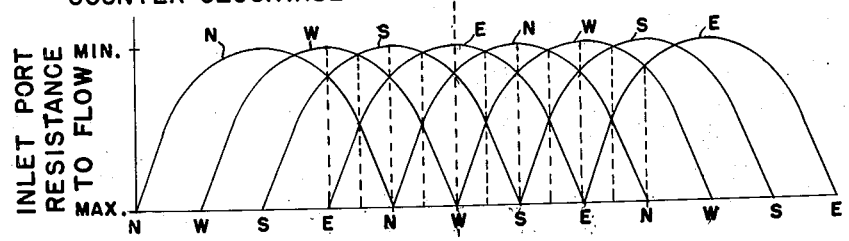
FIG.7.
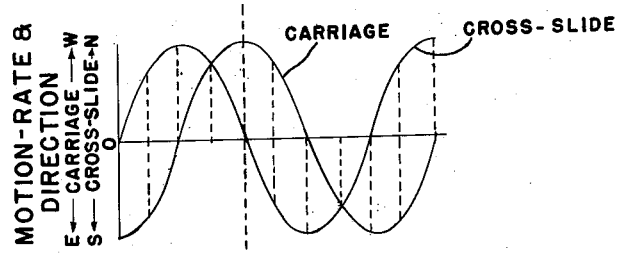
FIG.8.
DIRECTION OF
TOOL MOVEMENT
INVENTOR
*Bernard Sassen*
BY *Cushman, Darby & Cushman*
ATTORNEYS United States Patent Office 2,972,868
Patented Feb. 28, 1961

2,972,868

MACHINE TOOL SLIDE CONTROL

Bernard Sassen, Torrington, Conn., assignor to The Monarch Machine Tool Co., Sidney, Ohio, a corporation of Ohio Continuation of abandoned application Ser. No. 387,622, Oct. 22, 1953. This application Mar. 5, 1958, Ser. No. 719,389

20 Claims. (Cl. 60—97)

This invention relates to machine tools, and more particularly to mechanism for operating the various movable work or tool slides of machine tools. This invention especially pertains to an improved manual slide control mechanism and to an improved pattern-controlled slide control mechanism for alternatively controlling the slide motive equipment of a machine tool.

Pattern-controlled machine tools frequently employ hydraulic slide motive equipment that is controlled by a tracer mechanism engageable with a pattern. However, the slide motive equipment of hydraulic tracer-controlled machine tools usually is not adapted for manual control. Hence, such a machine tool sometimes is impractical or uneconomical when tracing work is not always at hand.

Accordingly, it is an object of this invention to provide a machine tool with both manual slide controls and tracer slide controls for alternatively operating the slide motive equipment of the tool.

It is another object of this invention to provide a machine tool with an improved manual slide control.

It is another object of this invention to provide a machine tool having two slides with manual control mechanism therefor that is operable by a single manual control lever, movement of the lever in planes parallel to the linear paths of travel of the slides serving to effect corresponding directional movements of the latter. In other words, the invention contemplates a "joy-stick" type of manual control handle which, when applied to a lathe, is mounted on the carriage thereof, movement of the handle toward the tailstock or the headstock causing corresponding carriage movement, and movement of the handle toward or away from the work causing corresponding cross slide movement.

It is another object of this invention to provide a machine tool with slide control mechanism operable by a manual control handle of the type described above, which normally will effect movement of the slides at a rate corresponding to a predetermined feed rate.

It is another object of this invention to provide slide control mechanism for a machine tool operable by a single control handle as aforedescribed which by movement of the control handle to any one of its extreme positions will effect rapid traverse movement of the corresponding slide in the corresponding direction.

It is another object of this invention to provide a machine tool having manual slide control mechanism of the type aforedescribed with tracer control mechanism, and also with means for readily and selectively using either of the control mechanisms.

It is another object of this invention to provide a machine tool that has manual slide control mechanism with means for readily attaching tracer control mechanism to the tool, which tracer mechanism can be readily disconnected and removed for reconditioning or repair.

It is another object of this invention to provide a pattern-controlled machine tool with an improved tracer mechanism which is capable of effecting continuous angular movements of the work or of the tool through angles greater than 360°.

It is a further object of this invention to provide a machine tool of the type described which is relatively simple in design and consequently economical to manufacture and easy to maintain and operate.

This invention is particularly applicable to a machine tool having two slides that are movable at right angles to each other. One of the slides may carry a cutting tool, as in the case of the cross slide of a lathe, or may carry work, as in the case of the work slide of a milling machine or the like. The invention will be described with particular reference to a lathe, but it will be understood that the invention is equally applicable to the work slides of a milling machine or a simliar machine tool wherein the work is moved relative to a tool.

Other objects and advantages of the invention will be apparent from the following description and accompanying drawings, in which:

Figure 2 is a plan view of the lathe shown in Figure 1.

Figure 3 is an end view of the lathe shown in Figure 1 and taken from the right-hand side of the latter figure.

Figure 4 is a schematic view of a hydraulic system embodying this invention.

Figure 5 is a perspective view illustrating a possible construction and combination of manual control valves embodying this invention.

Figure 6 is a diagram illustrating the varying rates of flow through the various flow paths of a tracer unit valve embodying this invention in accordance with the position of the valve.

Figure 7 is a chart illustrating the direction and rate of motion of the two slides in accordance with the position of the tracer unit valve.

Figure 8 is a chart illustrating the direction of tool movement resulting from the combined slide movements shown in Figure 7.

Figure 9 is a fragmentary perspective view illustrating a possible construction of the tracer unit valve, and the servo-motor therefor, shown in Figure 4.

Figure 1:
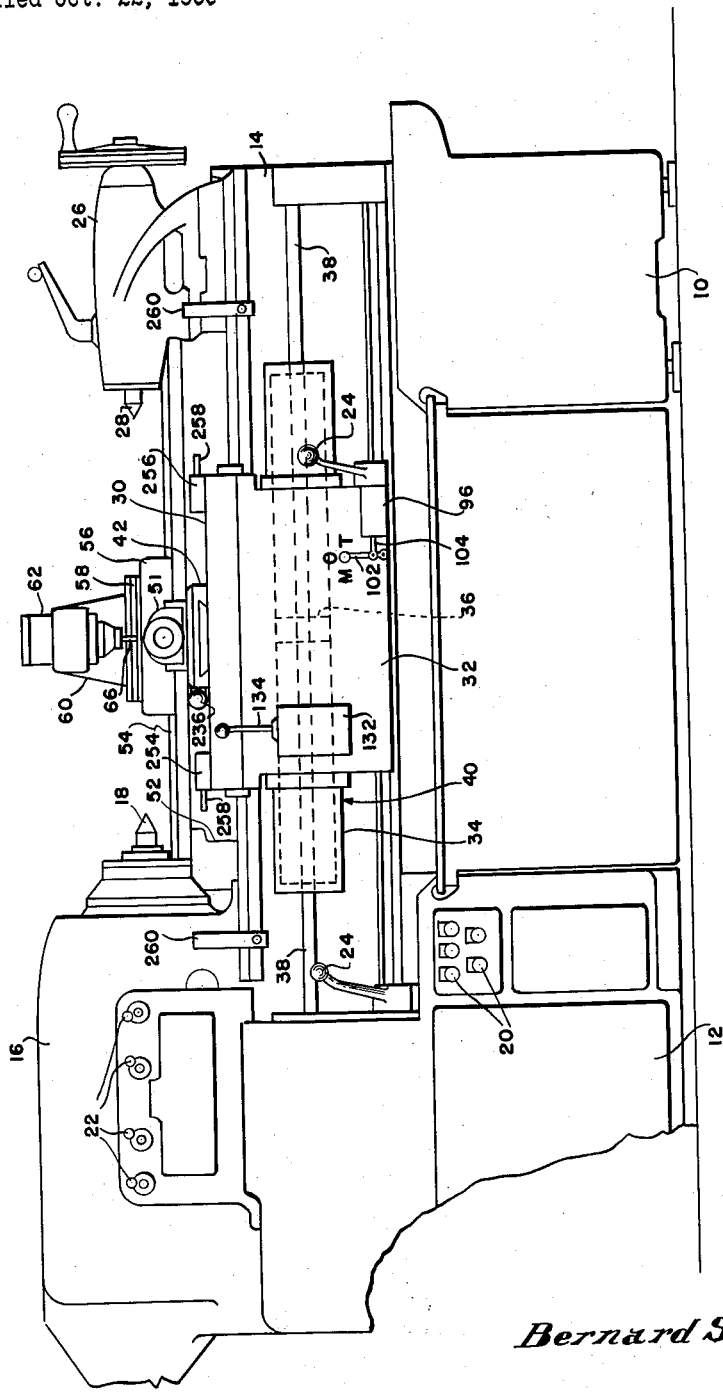
Figure 1 is a front elevational view of a lathe embodying this invention.

Referring now to Figures 1, 2, and 3 of the drawings, there is shown therein a conventional type of lathe having a tailstock leg 10 and a headstock leg 12. Supported by the legs is a lathe bed 14 having a headstock 16 suitably mounted at one end thereof and provided with a center 18. The headstock 16 is driven by a main drive motor (not shown) enclosed within the leg 12 and controllable by various push buttons 20. The headstock also has suitable speed-change devices (not shown), such as a transmission which is adjustable by conventional gear shift handles 22, and a conventional clutch (not shown) which is controlled by the handles 24.

Mounted on the other end of the bed 14 is a tailstock 26 having a center 28 which, together with the headstock center 18, is adapted to support a work piece (not shown) to be turned on the lathe. The work piece is driven in the usual manner by a lathe dog and dog plate (not shown). Slidably mounted on the bed 14 for longitudinal movement therealong is a carriage 30 having a depending apron 32 provided with a longitudinal power cylinder 34. Within the cylinder 34 is a stationary piston 36 supported substantially midway between the centers 18 and 28 by means of opposite piston rods 38 sealingly extending through opposite ends of the cylinder and appropriately secured to the opposite ends of the lathe bed 14. The cylinder 34, piston 36, and rods 38 constitute a fluid motor 40 for moving the carriage 30.

The carriage 30 slidingly supports a cross slide 42 which includes a power cylinder 44 (Figure 3) extending transversely of the bed 14. Disposed within the cylinder 44 is a piston 46 having opposite piston rods 48 sealingly extending through the opposite ends of the cylinder and connected to portions of the carriage 30 spaced transversely of the lathe bed. The cylinder 44, piston 46, and rods 48 constitute a fluid motor 50 for moving the cross slide 42. On the front of the cross slide is a pivotally mounted tool slide 51 which is operable by a hand wheel. The tool slide 51 conventionally carries a tool (not shown) for machining a work piece carried between the centers.

On the rear of the bed 14 and mounted adjacent each end thereof are a pair of arms 52 which extend upwardly above the cross slide 42 and support on their upper ends a template rail 54 which extends over the cross slide and has a template holder 56 for supporting a profile template 58 substantially parallel to the work piece. On the rear of the cross slide 42 is a bracket 60 which carries a casing 62 that houses a portion of the tracer mechanism embodying this invention. This portion of the tracer mechanism includes a tracer valve 64 (Figure 4) and a depending tracer finger 66 which is engageable with the template 58 to actuate the valve.

The manual control mechanism

Referring now to Figure 4, there is shown a schematic hydraulic circuit for operating the motors 40 and 50 by manual control. The circuit includes a positive displacement pump 68 receiving hydraulic fluid from a sump 70 through a conduit 72 and discharging the fluid, under high pressure, to a flow divider 74 via a conduit 76. Preferably, the discharge conduit 76 has a pressure relief valve 78 connected thereto and vented to the sump 70 via a return flow conduit 80 in order to protect the pump 68 and the hydraulic system against excessive pressures. The flow divider 74 discharges fluid into the two conduits 82 and 84 and consists of two connected elements 86 and 88, the first element 86 serving to divide the flow from the conduit 76 into two flow streams, and the second element 88 serving to maintain a constant ratio between the flow rates of the two streams. The first element 86, which is of a type well known in the art, includes a pair of inversely-variable hydraulic resistances 90 and 92. When the pressures at the downstream side of the two resistances 90 and 92 are equal, the flow rates in the two streams flowing therethrough are inversely proportional to the hydraulic resistance values of the two resistances. The pressure at the downstream side of the resistance 92 is maintained equal to that at the downstream side of the resistance 90 by the second element 88 which comprises a balancing valve of a type well known in the art. Power fluid for the operation of the hydraulic motors 40 and 50 is provided by the conduit 82, while the flow in conduit 84 is returned to the sump 70, as hereinafter explained. Obviously, the flow in conduit 82 can be controlled by adjusting the resistances 90 and 92, so that the flow divider 74 serves as a feed rate control for the motors 40 and 50.

The power fluid conduit 82 is connected to the inlet port 94 of a combination shut-off and transfer valve 96. This valve 96 comprises a cylindrical casing 98 having various inlet and outlet ports and an interior reciprocable valve spool 100 having various lands thereon for covering and uncovering corresponding ports. The valve 96 is conveniently mounted on the apron 32 of the lathe carriage 30 and is operable by a handle 102 pivotally connected to one end of a projecting stem 104 of the spool valve, one end of the handle being pivotally secured to the apron, as is shown in Figures 1 to 3. In the off O position (Figure 4), the valve 96 serves to shut off the supply of power fluid to both the manual and the tracer control mechanisms for the motors 40 and 50 and also to disconnect both of these mechanism from the motors. In the tracer T position, the valve 96 serves to connect the supply of power fluid to the tracer control mechanism (later described) and also to connect the latter to the motors 40 and 50, while in the manual M position, the valve serves to connect the supply of power fluid to the manual control mechanism and also to connect the latter to the motors.

When the valve handle 102 is moved to the left or M position, the land 106 on the valve spool 100 uncovers the outlet port 108 so that power fluid flows from the conduit 82 through the valve and, via the conduit 110 and two branches 112 and 114 thereof, to the inlet ports 116 and 118 of a manual cross slide control valve 120 and a manual carriage control valve 122, respectively. The valve 120 controls the admission and exhaust of power fluid to the cross slide motor 50, while the valve 122 controls the admission and exhaust of pressure to the carriage motor 40. The two valves 120 and 122 comprise cylindrical casings 124 and 126 having valve plugs 128 and 130, respectively, rotatable therein.

The two control valves 120 and 122 preferably are mounted as a single unit and may be enclosed within an appropriate housing 132 that desirably is secured to the apron 32 of the machine tool carriage. Both valves are controlled by a single "joy-stick" type of handle 134, i.e., a lever upstanding from the top of the housing, as is best shown in Figures 1 to 3, and mounted for movement in two perpendicular planes, one parallel to the path of travel of the carriage 30 and the other parallel to the path of travel of the cross slide 42. The handle 134 is so connected to the valves 120 and 122 that movement of the handle from a neutral position in toward the work rotates the valve plug 128 in a counterclockwise direction, and movement out away from the work rotates the plug 128 in a clockwise direction. Likewise, when the handle is moved from its neutral position left toward the headstock 16, the valve plug 130 of the carriage control valve 122 rotates in a counterclockwise direction, while movement of the handle right toward the tailstock 26 rotates the valve plug 130 in a clockwise direction. For convenience of reference, the in and out directions of movement of the cross slide 42 and the handle 134 will be designated by N and S, respectively, while the right and left directions of movement of the carriage 30 and the handle 134 will be designated by E and W, respectively.

Although various structural means can be used to connect the two valves 120 and 122 together for the above-described operation by means of a single "joy-stick" type of control handle, a relatively simple type of arrangement is shown in Figure 5. In this figure, the casing 126 of the carriage control valve 122 has a bracket 136 for mounting the valve on the carriage apron 32 with the axis of the valve 122 substantially horizontal and disposed perpendicular to the path of travel of the carriage 30. The valve plug 130 has an extension 138 thereon which supports the casing 124 of the slide control valve 120, with the axis of the latter, when the carriage control valve 122 is in neutral position, being disposed horizontally and extending substantially parallel to the path of travel of the carriage 30. An extension 140 on the valve plug has an upstanding lever thereon which preferably has an offset upper end constituting the handle 134. Desirably the extended axes of the valves 120 and 122 and the handle intersect at 90° angles when the valves are in neutral position. By means of this construction, it will be seen that when the handle 134 is moved in the E or W direction, the valve plug 130 is rotated. Similarly, when the handle 134 is moved in the N or S direction, the valve plug 128 is rotated.

Equally angularly spaced on opposite sides of their inlet ports 116 and 118, the cross slide control valve 120 and the carriage control valve 122 are provided with the pairs of casing ports 144 and 146, and 148 and 150, respectively. These ports 144, 146, 148 and 150 are connected, via the conduits 152, 154, 156, and 158, respectively, to the ports 160, 162, 164 and 166, respectively, of the transfer valve 96. The ports 168, 170, 172 and 174 of the transfer valve are connected, via the conduits 176, 178, 180, and 182, respectively, to the motor cylinder ports 184, 186, 188 and 190, respectively, which open to the cylinder chambers 192, 194, 196 and 198, respectively. Thus, when the spool 100 of the transfer valve 96 is moved to manual M position, the lands 200, 202, 204 and 206 uncover the ports 160, 162, 164 and 166, respectively, so that communication is established between the ports 144, 146, 148 and 150 of the two control valves and the motor chambers 192, 194, 196 and 198, respectively.

The valve plugs 128 and 130 of the manual control valves 120 and 122 are provided with lands 208, 210, 212 and 214, which in the neutral position of these valves cover the ports 144, 146, 148 and 150, respectively. The valves 120 and 122 also have pairs of exhaust ports 216 and 218, and 220 and 222, respectively, equally angularly spaced beyond the inlet ports 116 and 118. When the manual control handle 134 is moved in the S direction, the land 210 of the valve 120 uncovers the valve port 146 and places it in communication with the valve inlet port 116, thus admitting power fluid to the chamber 194 of the motor 50. Accordingly, the cylinder 44, together with the cross slide 42, is moved in the S direction at a feed rate dependent on the adjusted flow rate in the power fluid supply conduit 82. At the same time, the land 208 of the valve 120 uncovers the valve port 144 and places it in communication with the exhaust port 216, so that fluid in the motor chamber 192 exhausts through the port 216 and is returned to the sump 70 via the return flow conduits 224 and 226.

It will be seen that movement of the control handle 134 in the N direction will serve to reverse the flow to and from the motor 50 and admit power fluid to the motor chamber 192 while exhausting fluid from the motor chamber 194 through the exhaust port 218 for return to the sump 70 via the return flow conduits 228, 230, 232 and 226. Similarly, movements of the control handle 134 in either the W or the E direction will cause a corresponding directional movement of the carriage 30 at a feed rate by admitting power fluid to one or the other of the chambers 196 and 198 of the motor 40, while at the same time exhausting fluid from the opposite chamber for return to the sump 70.

Possible overtravel of the cross slide 42 in either direction is prevented by two stop valves 234 and 236, which are mounted in transversely-spaced relation on the carriage 30 and have their opposed projecting valve stems 238 alternatively engageable by corresponding stops or abutments 240 adjustably mounted by any appropriate means on the cross slide 42. Since the stop valves 234 and 236 are identical, a description of the valve 234 will suffice for both. The stop valve 234 comprises a cylindrical casing 242 having a valve spool 244 mounted therein and normally urged by an interior spring 246 into a position wherein a casing outlet port 248 is normally covered by a land 250 on the valve spool. The inlet ports of the stop valves 234 and 236 are connected to branches of the conduits 176 and 178, respectively, while the outlet ports of the stop valves are connected to the return flow conduits 252 and 80 leading back to the sump 70.

It will be seen that engagement of the stem 238 of either of the two stop valves 234 or 236 by its corresponding adjustably-mounted stop or abutment 240 will move the land 250 to uncover the outlet port of the valve. Hence, pressure in the corresponding motor chamber 192 or 194 which is effecting the engaging movement of the cross slide 42 is relieved, to thereby stop further movement of the cross slide. In this manner, the travel of the cross slide 42 in both N and S directions can be adjustably limited by suitable adjustment of the abutments 240.

In like manner, the carriage 30 is provided with two stop valves 254 and 256 identical to the valves 234 and 236 and mounted on the carriage at opposite ends thereof. The carriage stop valves 254 and 256 have their stems 258 projecting in opposite directions and engageable by abutments 260 adjustably mounted on the lathe bed 14. The stop valves 254 and 256 have their inlet ports connected to the motor chambers 196 and 198, respectively, and their outlet ports to the return flow conduit 80. It will be apparent that when the stem 258 of either of the stop valves 254 and 256 engages against its corresponding abutment 260, the pressure in the corresponding motor chamber 196 or 198 which is urging the carriage 30 to travel in the direction to effect such engagement will be relieved and thereby likewise stop further movement of the carriage. Adjustment of the abutments 260 obviously will serve to adjust the limit of travel of the carriage 30 in either direction.

The manual control valves 120 and 122 are each provided with a pair of closely spaced casing ports 262 and 264, and 266 and 268 located substantially diametrically opposite the corresponding casing inlet ports 116 and 118. Corresponding pairs of lands 270 and 272, and 274 and 276 are also provided on the valve plugs 128 and 130, respectively, of the two manual control valves. These lands are positioned so that one of the lands 270, 272, 274 or 276 will cover its corresponding port 262, 264, 266 or 268, respectively, when a valve plug 128 or 130 is moved to an extreme position in any one of the four directions N, S, E, W. The return flow conduit 84 leading from the flow divider 74 is connected to a conduit 278 leading to the port 268 of the carriage control valve 122. A conduit 280 connects the ports 266 and 264 of the carriage control valve 122 and the cross slide control valve 120, respectively, while a conduit 282 connects the port 262 of the cross slide control valve to the return flow conduit 232.

Accordingly, it will be seen that when either of the manual control valves 120 or 122 is moved to one of its two extreme positions, a corresponding land 270, 272, 274 or 276 will cover its corresponding port 262, 264, 266 or 268, respectively, thus blocking flow from the conduit 84 back to the sump 70. On this event, a small stem or lug 89 on the spool of the balancing valve 88 prevents the spool from cutting off the flow into the conduit 82, so that all of the output of the pump 68 is forced through the power fluid conduit 82 and thus all of the output of the pump is supplied to one of the motors 40 or 50 to move either the carriage 30 or the cross slide 42 at a faster rate. Thus, when the manual control handle 134 is moved in one of its four directions by only a small amount, the carriage or the cross slide will be moved in the corresponding direction at a predetermined feed rate, while further movement of the handle to an extreme position will effect movement of the carriage or the cross slide at a faster or traverse rate.

Thus, a manual control mechanism is provided having a single manually-operable handle that affords both directional and selective rate control of the movements of the two slides of a machine tool. Moreover, it will be seen that the handle 134 is capable of movement in directions intermediate the N, S, E, and W directions. Movement of the handle in such intermediate directions will effect movement of both of the slides 30 and 42 with a resultant tool movement in a generally corresponding intermediate direction. If both motors 40 and 50 are of the same size, the feed rate of both will be substantially equal for a given flow of power fluid. In this event, movements of the manual control handle 134 to any one of the four intermediate positions between N, S, E, and W will cause movements of the slides at substantially equal rates with a resultant tool movement in a corresponding NW, NE, SE or SW direction.

The tracer mechanism

Referring again to Figure 4 of the drawings, it will be seen that tracer mechanism embodying this invention can be connected to the aforedescribed manual control and slide motive mechanism by six conduits, the conduits 284 and 286 being a power fluid supply conduit and a return flow conduit, respectively, while the conduits 288, 290, 292 and 294 serve to connect the tracer mechanism to the two motors 40 and 50. If desired, these six conduits can be provided with appropriate disconnectable joints (not shown) intermediate their ends for convenient removal or attachment of the tracer mechanism to the machine tool.

The conduit 284 leads from the outlet port 296 of the transfer valve 96, so that when the latter is shifted to tracer T position the land 298 uncovers the port 296 to permit the flow of power fluid from the conduit 82 to the tracer mechanism. At the same time, the land 106 covers the port 108 and thus shuts off the supply of power fluid to the manual control mechanism, while the lands 200, 202, 204 and 206 cover the ports 160, 162, 164 and 166, respectively, thus disconnecting the manual control mechanism valves 120 and 122 from the motors 40 and 50. The tracer mechanism conduits 288, 290, 292 and 294 are connected to the ports 300, 302, 304 and 306, respectively, of the transfer valve 96, so that in the T position of the latter the lands 200, 204, 206 and 308 uncover these ports and connect the conduits 288, 290, 292 and 294 to the conduits 178, 176, 180 and 182, respectively, leading to the slide motors 50 and 40. It also will be noted that the return flow conduit 278 is connected to the port 310 of the transfer valve 96, which port is uncovered by the land 202 only in the T position of the valve. A conduit 312 connects the port 314 of the valve 96 to the return flow conduit 252. Hence, when the transfer valve is in T position, the flow in conduit 278 is constantly returned to the sump 70 and cannot be blocked by inadvertent movement of the manual control handle 134 to an extreme position, which blockage would suddenly change the rate of flow in the tracer mechanism power fluid supply conduit 284 and create an undesirable change in the rate of tracer response.

Pressure fluid from the conduit 284 is fed to a flow divider 316 which discharges fluid into two conduits 318 and 320. The flow divider 316 consists of two connected elements 322 and 324, the first element 322 again serving to divide the flow from the conduit 284 into two flow streams, and the second element 324 serving to maintain a constant ratio between the flow rates of the two streams. The first element 322, which may be identical to the element 86 previously described, includes a pair of hydraulic resistances 326 and 328. These resistances may be substantially equal and fixed, or inversely variable as shown. When the pressures at the downstream sides of the two resistances 326 and 328 are equal, the flow rates in the two streams are inversely proportional to the hydraulic resistance value of the two resistances. The pressures in the two streams are maintained equal by the second element 324 which comprises a balancing valve, again of a type well known in the art and described in detail in my copending application Serial No. 295,086, now Patent No. 2,791,885. By this construction, it will be seen that the flow rate ratio of fluid entering the two conduits 318 and 320 is substantially constant, but can be adjusted inversely by adjustment of the two hydraulic resistances 326 and 328.

The two conduits 318 and 320 are connected, via branches 330 and 332 to the inlet ports 334 and 336, respectively, of the tracer valve 64. The tracer valve 64 comprises a cylindrical casing 338 having a reciprocable valve spool 340 therein. The valve spool 340 is provided with two spaced lands 342 and 344, both partially overlapping their corresponding inlet ports 334 and 336 by an equal amount when the valve spool is in what may be termed a neutral position, as shown in Figure 4. Thus, the cooperating lands 342 and 344 and ports 334 and 336 provide two inversely variable restrictions to flow from the branches 330 and 332, respectively. The valve casing 338 is also provided with an outlet port 346 which communicates with the space between the two lands 342 and 344 and has the return flow conduit 286 connected thereto and leading back to the sump 70. A spring 348 interposed between one end of the casing 338 and the valve spool 340 urges the latter in one direction, to the right as shown in Figure 4. The other end of the valve spool 344 is engaged by a ball 350, which is guided for rectilinear movement within an open end of the cylindrical casing 338 and is received in a recess 352 in one end of a tracer arm 354. The tracer arm 354 is supported for universal rocking movement, as by a ball and socket joint formed by a spherical enlargement 356 intermediate the ends of the arm 354 and cooperating with a complementary socket 358. On the outer end of the arm 354 is the tracer finger 66 which is adapted to bear against the template 58.

From the construction illustrated, it will be seen that the spring 348 constantly urges the valve spool 340 and, consequently, the ball 350 to the right and into the recess 352, to thereby urge the tracer arm 354 into a position wherein it is axially aligned with the valve spool 340. This position of the valve spool and of the tracer arm will be termed, for convenience, a non-deflected position. It likewise will be seen that when the tracer arm 354 is deflected to an extreme angular position, as by engagement of the finger 66 with the template 58, the valve spool 340 will be moved to an extreme far left position, as viewed in Figure 4. Intermediate these two positions of the valve spool, and corresponding positions of the tracer arm 354, i.e., non-deflected and fully deflected positions, there is a position of both elements which, for convenience, is termed a neutral position. In this position, which is illustrated in Figure 4, the restriction to flow from branches 330 and 332 are equal. The tracer arm 354, and consequently the spool 340, are adapted to be maintained in this neutral position by the force of the engagement of the finger 66 against the template 58.

Obviously, rocking movement of the tracer arm 354 from a non-deflected position moves the valve spool 340 to the left, as shown in Figure 4, thus inversely varying the restrictions to flow from the branches 330 and 332. When the arm 354 is in its non-deflected position, the restriction to flow from branch 330 is at a maximum, and from branch 332, at a minimum. In the neutral position shown, the restrictions to flow are equal. In the fully-deflected position of the arm 354, the restriction to flow from branch 330 is at a minimum, and from branch 332 is at a maximum.

The conduits 318 and 320 are connected to two cylinders 360 and 362, respectively, having opposed open ends within which pistons 364 and 366, respectively, are reciprocably mounted. The pistons 364 and 366 bear on opposite sides of an arm 368 interposed therebetween (Figures 4 and 9), whereby movements of the pistons, which constitute a servo-motor, serve to move the arm. Since the ratio of the flows entering the two conduits 318 and 320 is constant, inverse variation of flow restrictions in the tracer valve 64 by slight movements of the tracer finger 66 in either direction from its neutral position causes corresponding variations in the pressures in the two conduits. Thus, if the tracer finger 66 is moved from its neutral position to cause an increase in the restriction to flow from branch 330, while at the same time decreasing the restriction to flow from branch 332, the pressure will rise in conduit 318 and fall in conduit 320. Accordingly, the piston 364 will move outward of its cylinder 360 and push the piston 366 back into its cylinder 362, thereby moving the arm 368 to the right.

A branch 372 of the pressure fluid supply conduit 284 is connected to a flow divider 374, which may be identical to the flow divider 316. The conduits 376 and 378 connect the output of the flow divider 374 with two like flow dividers 380 and 382. These flow dividers 374, 380 and 382 may be provided with fixed or inversely variable hydraulic resistances depending upon whether later adjustment is considered desirable. The flow dividers 374, 380 and 382 thus produce four fluid streams through the conduits 384, 386, 388 and 390. The flow rate ratio of fluid entering the two conduits 384 and 386 is constant, while the flow rate ratio of fluid entering the two conduits 388 and 390 is constant. The conduits 384, 386, 388 and 390 are connected to the conduits 288, 290, 292 and 294, respectively, and also to four inlet ports 392, 394, 396 and 398 of a tracer valve unit 400. These ports 392, 394, 396 and 398 may also be designated by S, N, W, and E, respectively, for reasons later obvious.

The tracer valve unit 400 has a cylindrical casing 402 provided with a valve plug 404 rotatable therein and connected to the arm 368 for rotation thereby as best shown in Figure 9. Accordingly, it will be seen that increasing deflection of the tracer finger 66 from its neutral position will increase the pressure in conduit 320 and cause the arm 368 to be moved in a direction to effect clockwise movement of the valve plug 404, and, correspondingly, decreasing deflection of the tracer finger from its neutral position will cause a pressure rise in conduit 318 to thereby cause counterclockwise movement of the valve plug. Thus, whenever the tracer finger 66 is not in its neutral position, the valve plug 404 is moving and will not come to rest until the finger returns to its neutral position. This the finger will do because of template-following movements of the tracer valve 64 effected by the tracer valve unit 400, as later described. Of course, from a practical standpoint the valve plug 404 will not continue to move indefinitely because stops, only one of which, 448, is shown, are employed to limit the range of movement of the plug to a practical operating range.

The inlet ports 392, 394, 396 and 398 of the tracer unit valve 400 preferably are substantially equally angularly spaced about the circumference of the casing 402, and equally angularly spaced on opposite sides of the inlet ports are corresponding pairs of casing outlet ports 406 and 408, 410 and 412, 414 and 416, and 418 and 420. These pairs of outlet ports are connected to a collecting conduit 422 which has a conduit 424' connected thereto and leading to the return flow conduit 286 for the return of fluid passing out of the outlet ports back to the sump 70.

For each of the casing inlet ports and its corresponding pair of outlet ports, the surface of the valve plug 404 is provided with corresponding pairs of circumferentially-spaced grooves or indentations 424 and 426, 428 and 430, 432 and 434, and 436 and 438 having corresponding lands 440, 442, 444 and 446 between each pair of grooves. The circumferential width of each plug land is substantially equal to that of its corresponding casing inlet port 392, 394, 396 or 398, while the circumferential width of each plug groove is sufficient to overlap its corresponding casing inlet port and adjacent casing outlet port. Thus, for example, in the central position of the plug 404 shown in Figure 4, the land 444 substantially completely closes off the inlet port 396. If, however, the valve plug 404 is rotated counterclockwise, fluid will flow from the port 396, into the groove 432, and out of the outlet port 414 for return to the sump 70. As the plug 404 moves counterclockwise from the central position shown in Figure 4, the resistance to flow from the inlet port 396 decreases from a maximum to a minimum, when the groove 432 exactly overlaps both the inlet port 396 and the outlet port 414, and thence rises with the decreasing overlapping of the outlet port 414 by the groove 432 until another maximum flow resistance is reached when communication between the groove 432 and the outlet port 414 is cut off. Correspondingly, clockwise rotation of the plug 404 from its central position causes a decrease from a maximum to a minimum and then an increase to another maximum in the resistance to flow from the inlet port 396 through the groove 434 and out of the outlet port 416.

Referring now to Figure 6 of the drawings, the relative values of the resistance to flow through the inlet port 396 or W of the tracer unit valve 400 for corresponding angular positions of the valve plug 404 are illustrated diagrammatically by the curve W. Each of the other inlet ports has the same flow resistance variation, but the flow resistance variations of all of the inlet ports are out of phase, as illustrated by reference to Figure 6, wherein the curves S, N, and E illustrate the flow resistance variations of the ports 392, 394 and 398, respectively. Thus, it will be seen that when the flow resistance of the inlet port 396 or W is maximum, the flow resistance of the inlet port 398 or E is minimum and the flow resistances of the inlet ports 392 or S and 394 or N are equal but somewhat greater than the flow resistance of the inlet port 398 or E.

When the plug valve is in the central position shown in Figure 4, the flow resistance of the inlet port W of the tracer valve unit 400 is at a maximum, while the flow resistance of the inlet port E is at a minimum. Hence, the pressure in conduit 292 is at a maximum, while the pressure in conduit 294 is at a minimum, with a corresponding differential pressure between the two chambers 196 and 198 of the carriage motor 40. Accordingly, the carriage 30 will move in a W direction at a maximum rate. In this same position of the valve plug 404, the flow resistances of the inlet ports S and N are equal, and since the flow rate ratio of fluid entering the conduits 384 and 386 is constant, the pressures therein are equal with corresponding equal pressures in the two chambers 194 and 192 of the cross slide motor 50. Hence, the cross slide 42 is stationary.

The separate movements of the carriage 30 and the cross slide 42 in accordance with the extent of practical angular displacement of the valve plug 404 from its central position (as limited by stops) are shown in the rate and direction chart illustrated in Figure 7. Referring to Figure 8, the resultant direction of tool movement corresponding to the angular position of the valve plug 404 of the tracer unit valve 400 is also shown. Since deflections of the tracer finger 66 from its neutral position move the valve plug 404, the latter changes position in accordance with the dictates of a template.

Initially, before engagement of the tracer finger 66 with a template, the tracer valve 64 will be in its non-deflected position. Consequently, the tracer unit valve plug 404 moves counterclockwise to its full practical extent so that the tool and the tracer valve 64 will be moving in the E direction, as is evident from an inspection of Figures 6, 7 and 8. In many instances, E is an unsatisfactory direction of movement of a tracer finger for initial engagement thereof with a template. For this reason, an adjustable stop 448 is provided to limit the practical extent of counterclockwise movement of the valve plug 404 from its central position. By adjusting the stop 448, a different initial direction of tracer finger travel can be selected, e.g., NE or N, as is also evident from an inspection of Figures 6 and 8.

Thus, for example, if the tracer finger 66 initially moves N in order to engage an edge of a template that extends parallel to the axis of rotation of the work, on engagement with the template the finger would be deflected from its non-deflected position toward its deflected position. This movement of the tracer finger 66 would cause the tracer unit valve plug 404 to start to move clockwise and so start to move the tracer finger, and the tool NW, and then W, as shown from an inspection of Figures 6 and 8. Continuing clockwise movement of the tracer unit valve plug 404 past its central position, wherein the tracer valve mechanism 64 and the tool are moving W, ceases because the tracer finger 66 reaches its neutral position and becomes stabilized and held in such position by its engagement with the edge of the template. The tracer unit valve 400 is then in its central position, and the tool, together with the tracer valve 64, would be moving in the W direction. If the tracer finger 66 then should come in contact with a shoulder on the template facing in the E direction, so that the tool should move south to follow such shoulder, the finger, because of the W movement of the tracer valve mechanism 64, would be deflected further from its neutral position, thus, increasing the resistance to flow from branch 332 and causing a pressure rise in conduit 320 which would move the valve plug 404 clockwise from its central position. Clockwise movement of the valve plug 404 then commences which, as seen from an inspection of Figures 6 and 8, starts to add an S component to the W direction of movement of the tool and the tracer valve mechanism 64. Such clockwise movement of the valve plug 404 would then continue until the tool and the tracer valve 64 start to move in the S direction, as seen from an inspection of Figure 8. Because the tracer finger 66 then would still be deflected from its neutral position, the continuing pressure differential between conduits 320 and 318 would continue to move the valve plug 404 clockwise and impart an E component to the direction of movement of the tool and tracer valve 64, thus lessening tracer deflection until further movement of the valve plug 404 ceases when the finger reaches its neutral position. If then because of the E component, the tracer valve 64 moves away from the shoulder on the template, the finger 66 will move through its neutral position toward its non-deflected position to thus move the valve plug 404 counterclockwise until the E component of movement of the tracer valve 64 and the tool is eliminated, and the valve plug 404 becomes stabilized in the position wherein the tool is moving south with the finger 66 riding the template shoulder in its neutral position.

In actual practice the above-described hunting movements of the tool and finger 66 are imperceptible because the tracer valve 64 is responsive to very small deflections of the finger 66, so that the plug 404 rapidly becomes stabilized in a new angular position occasioned by a change in template contour. Accordingly, the tracer valve 64 constitutes a feed-back servo mechanism that provides a constant deflection tracer.

Referring again to Figure 8, it will be seen that the arrangement of the phased resistances to flow in the tracer unit valve 400 causes the resultant movement of the carriage and cross slide to be responsive to tracer control through 450°, i.e., E to N to W to S to E to N. This angular extent of tracer control is not necessary on a lathe, but is particularly useful on milling machines and the like.

It will be obvious that the various conduits described above can be flexible, or otherwise extensible, wherever appropriate. It further will be realized that the functions of the several valves for which a specific structure has been illustrated and described can be performed by valves of different structure. For example, the manual control valves 120 and 122 could be provided by reciprocating valves of appropriate construction and connected together for selective operation by a single control lever by appropriate mechanical linkages. Further, the tracer unit valve 400 could be of a reciprocating design.

Thus, it will be seen that the objects of this invention have been fully and effectively accomplished. It will be realized, however, that the specific embodiment shown and described for the purpose of illustrating the principles of this invention is susceptible of change without departure from such principles. Accordingly, this invention includes all modifications encompassed within the spirit and scope of the following claims.

This application is a continuation of my co-pending application, Serial No. 387,622, filed October 22, 1953, now abandoned.

I claim:

1. A movement-effecting and control system for a machine tool comprising: a pair of motive means, one movable by the other, for effecting reversible linear movement along a pair of angularly disposed paths; control means for said motive means including means for operating the latter to effect said movement selectively at preset feed or rapid-traverse rates; means independent of said control means for adjusting said feed rates; and a single manually-operable handle operatively connected to said control means for operating the latter to effect movement of said motive means selectively and at said feed rates or said rapid-traverse rates selectively.

2. A movement-effecting and control system for a machine tool comprising: a pair of reciprocating double-acting hydraulic motors, one movable by the other and with the paths of movement effected by said motors disposed at an angle to each other; control means for said motors including means for operating the latter selectively at preset feed rates or rapid-traverse rates; means independent of said control means for adjusting said feed rates; and a single manually-operable handle operatively connected to said control means for operating the latter to effect movement of said motors selectively and at said feed rates or said rapid-traverse rates selectively.

3. A movement-effecting and control system for a machine tool comprising: a pair of motive means, one movable by the other, for effecting reversible linear movement along a pair of angularly disposed paths; control means for said motive means for operating the latter selectively at preset feed or rapid traverse rates; and a single manually-operable handle mounted for controlling movements generally parallel to said movement paths and operatively connected to said control means for operating the latter to effect movement of said motive means selectively, at said feed or said rapid traverse rates selectively, and in directions corresponding generally to the direction of movement of said handle.

4. The structure defined in claim 3 in which the motive means are hydraulic and the control means includes control valves.

5. The structure defined in claim 3 in which the control means is operable to effect movement at the rapid-traverse rates by extreme movements of the handle in the said directions.

6. A movement-effecting and control system for a machine tool comprising: a pair of double-acting hydraulic motors disposed with their paths of movement at an angle to each other; hydraulic control means for said motors including means for operating the latter selectively at preset feed or rapid-traverse rates; means independent of said control means for adjusting said feed rates; a single manually-operable handle operatively connected to said control means for operating the latter to effect movement of said motors selectively and at said feed or said rapid-traverse rates selectively; a hydraulic tracer control system for said motors to operate the latter in accordance with the dictates of a pattern; and valve means for selecively connecting said hydraulic control system or said tracer control means to said motors.

7. The structure defined in claim 6 in which the handle is mounted for controlling movements generally parallel to the movement paths and operates the control means to effect movement of said motors in directions corresponding generally to the direction of movement of said handle.

8. The structure defined in claim 6 including a source of fluid under pressure, and in which the valve means selectively connects said source to the hydraulic control means or to the tracer control system.

9. A movement-effecting and control system for a machine tool comprising: a pair of double-acting hydraulic motors for effecting linear movement along a pair of angularly disposed paths; a hydraulic pressure source; flow dividing means connected to said source to provide first and second flow branches and for maintaining a substantially constant flow rate ratio between said branches; hydraulic control means for said motors connected between the latter and said first branch; and a single manually-operable handle operatively connected to said control means for operating the latter to effect operation of said motors selectively.

10. The structure defined in claim 9 in which the flow dividing means is adjustable to vary the flow rate ratio in the branches, and thereby vary the rate of movement effected by each motor.

11. The structure defined in claim 9 in which the first branch supplies power fluid to the motors to operate the latter to effect movement at feed rates, and wherein the second branch is also connected to the control means and the latter includes means selectively operable by the handle for blocking flow from said second branch to thereby supply said motors with additional power fluid and operate said motors to effect movement at rapid traverse rates.

12. A hydraulic servomotor system comprising: two pairs of flow lines; a fluid motor connected between the two lines of each of said pairs and operable by pressure differentials between said two lines; means for supplying the lines of each pair with pressure fluid in a substantially constant flow rate ratio; a tracer unit valve including a casing and a movable valve member therewithin, said casing being provided with two pairs of inlet ports having said flow line pairs correspondingly connected thereto; land means associated with said valve cooperative with said pairs of casing ports to define two corresponding pairs of variable resistance flow paths through said valve, the resistance of each path being variable consecutively from high to low to high to low to high on unidirectional movement of said member and the resistance variations of all said paths being consecutively phased so that when the flow resistance of one path of one pair is at its low, the resistance of the other path of said one pair is at its high and the resistances of the paths of the other pair are equal; and pattern-engagement-responsive means for changing the position of said valve member.

13. The structure defined in claim 12 in which the pressure fluid supplying means comprises a fluid pressure source and flow dividing means connected to said source and to said flow line pairs.

14. The structure defined in claim 12 in which the pattern-engagement-responsive means includes a hydraulic servomotor.

15. The structure defined in claim 12 in which the pattern-engagement-responsive means includes a pair of flow lines, means for supplying said lines with pressure fluid in a substantially constant flow rate ratio, hydraulic means responsive to pressure differentials in said lines for moving the valve member, a tracer valve connected to said flow lines for controlling the discharge from each, and a tracer finger for operating said tracer valve.

16. The structure defined in claim 15 in which the tracer valve includes a pair of inversely variable hydraulic resistances, one connected to each of the flow lines for discharge of fluid therethrough.

17. In a control system for a pattern-controlled machine tool the combination comprising: two pairs of flow lines; means for supplying the lines of each pair with pressure fluid in a substantially constant flow rate ratio; a fluid motor connected between the lines of each pair for differential pressure operation; and means for controlling the speed and direction of operation of said motors including a variable fluid resistance connected to each flow line for discharge of fluid therethrough, means operable by unidirectional movement for varying each resistance from high to low to high to low to high, and means connecting said resistance-varying means for consecutively phased variation of the latter so that when the discharge resistance of one line of a said pair is high the discharge resistance of the other line of the said pair is low and the discharge resistances of the lines of the other of said pairs are equal.

18. In a tracer unit valve the combination comprising: a valve casing having ports therein opening to an interior valve chamber; a movable valve member within said chamber; and land means associated with said valve member and cooperative with said ports defining two pairs of variable resistance flow paths through the valve, the resistance of each path being variable consecutively from high to low to high to low to high on unidirectional movement of said valve member and the resistance variations of all said paths being equally and consecutively phased so that when the resistance of a path of one pair is at its low the resistance of the other path of said one pair is at its high and the resistances of the paths of the other pair are equal.

19. A control system for a pair of fluid motors adapted to effect reversible linear movement along a pair of angularly disposed paths, comprising: a tracer unit valve for controlling the operation of the motors; a fluid pressure source; a flow divider connected to said source to provide first and second fluid streams having a substantially constant flow rate ratio therebetween; pressure-responsive hydraulic means connected between said branches and to said tracer unit valve for changing position of the latter to control the operation of the motors; and a tracer valve connected to said branches and having means defining two inversely-variable flow restrictions, one connected to each of said branches for discharge of fluid therethrough.

20. A control system for a pattern-controlled machine tool having first and second slides movable along first and second angularly disposed paths, respectively, and first and second fluid motors for driving said first and second slides, comprising: a tracer unit valve for controlling the operation of the motors; a fluid pressure source, a flow divider connected thereto to provide first and second fluid streams having a substantially constant flow rate ratio therebetween; pressure-responsive-hydraulic means connected between said branches and to said tracer unit valve for changing the position of the latter; and a tracer valve connected to said branches and having means defining two inversely-variable flow restrictions, one connected to each branch for discharge of fluid therethrough.

References Cited in the file of this patent

UNITED STATES PATENTS

| | | |
|---|---|---|
| 1,339,332 | Greenly | May 4, 1920 |
| 1,904,112 | Achard | Apr. 18, 1933 |
| 1,999,834 | Ernst | Apr. 30, 1935 |
| 2,003,557 | Sassen | June 4, 1935 |
| 2,036,362 | Sassen et al. | Apr. 7, 1936 |
| 2,221,459 | Sassen | Nov. 12, 1940 |
| 2,330,567 | Ehrenberg | Sept. 28, 1943 |
| 2,403,519 | Gardiner | July 9, 1946 |
| 2,704,956 | Johnson | Mar. 29, 1955 |
| 2,791,885 | Sassen | May 14, 1957 |